Figure 1:
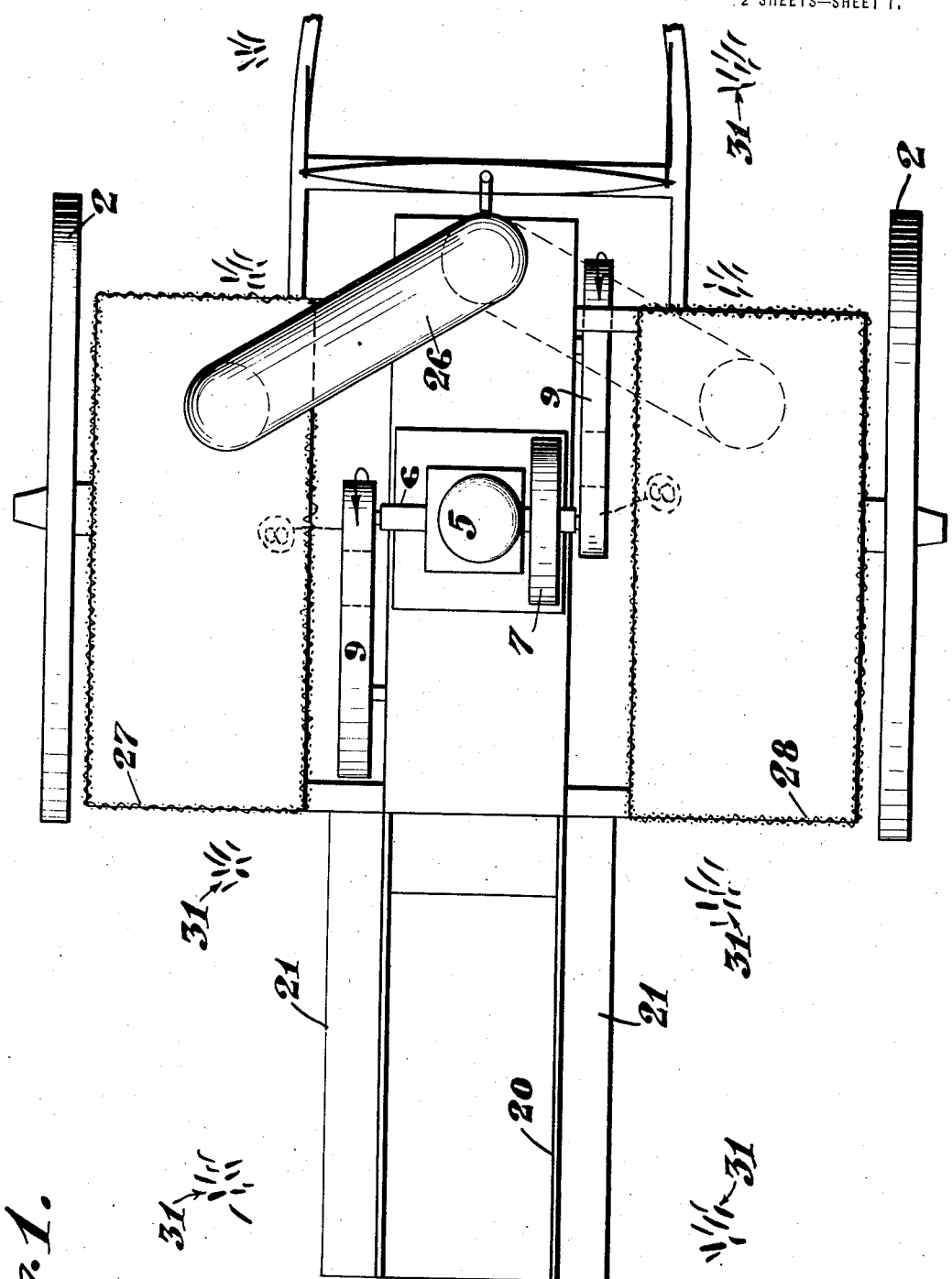

J. E. MITCHELL.
PORTABLE HARVESTING AND COTTON SEPARATING MACHINE.
APPLICATION FILED APR. 26, 1918.

1,332,910.

Patented Mar. 9, 1920.
2 SHEETS—SHEET 1.

Inventor:
John E. Mitchell,
By
Atty.

J. E. MITCHELL.
PORTABLE HARVESTING AND COTTON SEPARATING MACHINE.
APPLICATION FILED APR. 26, 1918.

1,332,910.

Patented Mar. 9, 1920.
2 SHEETS—SHEET 2.

Inventor:
JOHN E. MITCHELL,
BY
Atty.

UNITED STATES PATENT OFFICE.

JOHN E. MITCHELL, OF ST. LOUIS, MISSOURI.

PORTABLE HARVESTING AND COTTON-SEPARATING MACHINE.

1,332,910. Specification of Letters Patent. Patented Mar. 9, 1920.

Application filed April 26, 1918. Serial No. 230,977.

*To all whom it may concern:*

Be it known that I, JOHN E. MITCHELL, a citizen of the United States, residing in the city of St. Louis and State of Missouri, have invented new and useful Improvements in Portable Harvesting and Cotton-Separating Machines, of which the following is a specification.

This invention relates to cotton harvesting and separating machines, and has for its general object to provide a portable machine of this character in which the bolls snapped from the cotton plants may be thrown into the machine, and the cotton separated from the hulls and trash and delivered into suitable bags, or other receptacles carried by the machine, the latter being advanced across the field between the rows of cotton plants by horse power, or in any other desired manner.

The invention is characterized by simple means for separating the cotton from the hulls combined with means for elevating the cleaned cotton and delivering it into receptacles.

Under conditions now prevailing throughout the cotton-growing section of the country, the scarcity and high cost of labor are making it increasingly difficult for planters to have their cotton properly picked by hand so as to enable them to deliver it to the ginner free from hulls and thereby obtain the highest market price. By reason of such labor conditions, in order to save the crop, it has become common practice to gather or snap the cotton, sending the cotton mixed with the hulls to the market, where it brings a much lower price than it would have had it been hand picked. My present machine will enable planters to employ cheaper labor for snapping or gathering cotton, instead of picking it, the latter operation requiring skilled operators who demand a very high price for their labor; and the cotton can be snapped or gathered more rapidly by operators following the machine, into which the snapped cotton is thrown as soon as it is detached from the plant than where they have to carry the gathered product along in a bag or basket. Furthermore, the machine so thoroughly separates the hulls from the cotton that the cotton itself, when sent to the market commands as high a price as if it had been picked by hand, free from hulls in the first place. The machine, therefore, not only enables the planter to make the greatest saving in labor, resulting from gathering or snapping the cotton as against picking it, but it enables him to obtain as much for the cotton itself, as though it had been carefully hand-picked.

In some cotton sections, the hulls become so rotten that they separate or loosen at the point where they grow to the stalk, so that it is impossible to pick the cotton by hand without getting some hulls with it. In such cases, it is obviously impossible to get clean, hand-picked cotton free from hulls; whereas, with this machine, and with much less expenditure of labor, the cotton is gathered rapidly regardless of the hulls, and when the hulls are separated by the machine from the cotton, the latter being free from hulls, commands even a higher price than the most carefully hand-picked cotton.

The continuous separation of the gathered or snapped cotton from the bolls and hulls, as the cotton is harvested, and the ability to make a portable commercial machine of such character, is rendered possible by the employment of a cotton cleaning and separating machine of the type heretofore invented by me, or by Dennis Parks, and especially the type of machine invented by Parks and embodied in his pending application Serial No. 223,134, filed March 18, 1918. This machine is characterized by simplicity in construction and high efficiency in operation, and lends itself readily to adaptation as a portable device.

The cotton extracting and cleaning elements of the present machine however, are not claimed herein except, broadly, as a part of the general combination. It is conceivable, of course, that other types of cotton cleaning and extracting machines could be used, but the type of machine herein illustrated for extracting and cleaning cotton is preferred to any other within my knowledge.

The invention is illustrated in the accompanying drawings, in which—

Figure 2:
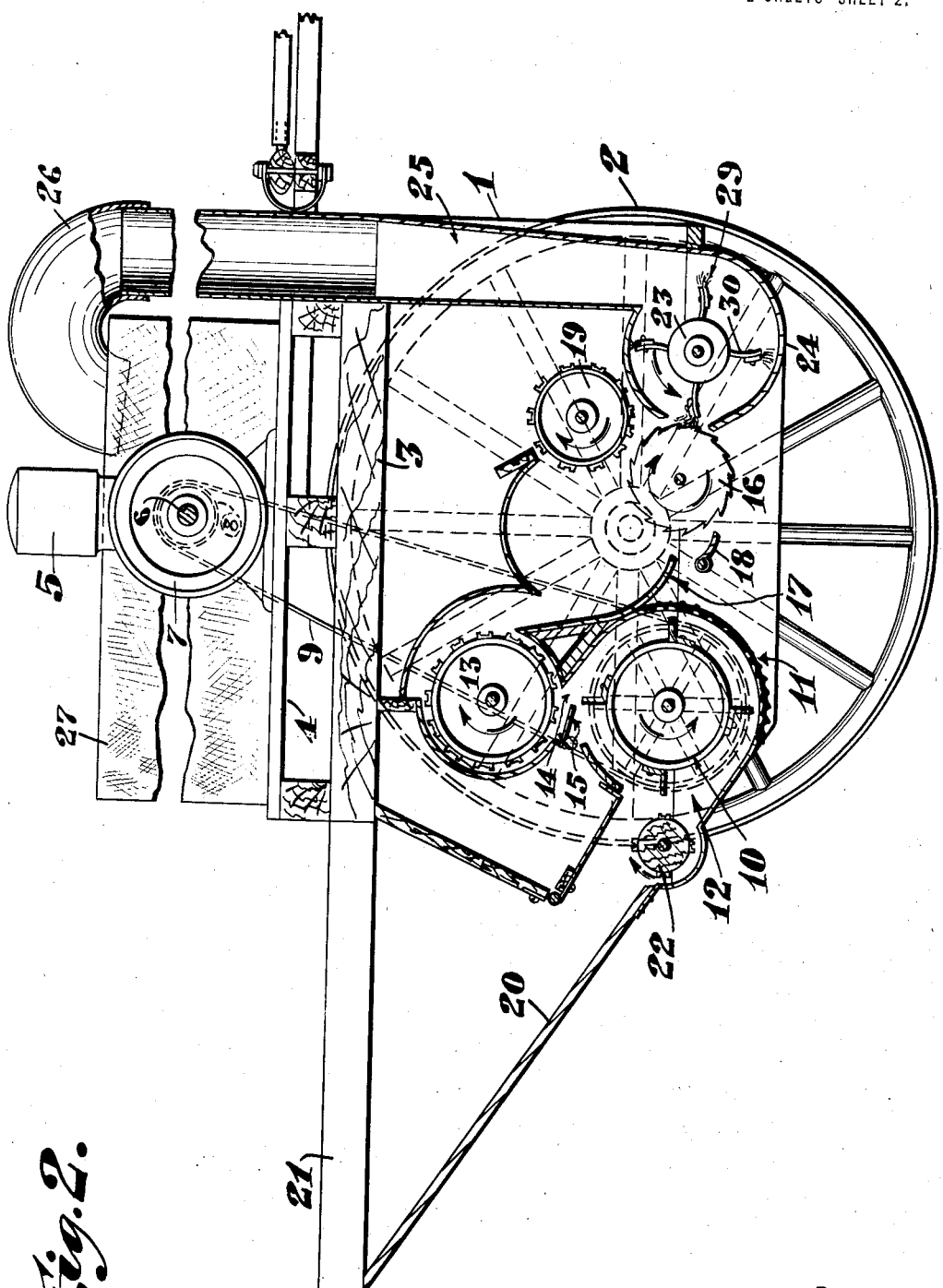

Figure 1, is a plan view of the machine constructed according to my invention; and Fig. 2, a central longitudinal sectional view thereof.

Referring to these drawings, the numeral 1 indicates generally the casing of a cotton extracting and cleaning machine which is supported at its sides on the axles of wheels 2. On the top 3 of this frame is arranged a platform 4 on which is mounted a gasolene, or other type of engine, indicated by 5. The driving shaft of this engine is indicated by 6, the fly wheel thereof by 7. Mounted on opposite ends of the shaft 6 are driving pulleys 8, over which pass belts 9 for driving the various elements of the separating machine. One of these belts is shown in Fig. 2 as passing directly to the pulley on the breaking cylinder, hereinafter referred to. It is deemed unnecessary to illustrate in detail the driving mechanism for the other parts of the machine, as such is of any preferred arrangement and constitutes no part of the present invention. Mounted within the casing 1 are the cotton extracting and cleaning elements, which comprise a breaking cylinder 10, traveling in proximity to a screen 11, and operating in a breaking chamber 12; a picker roll 13, operating in a chamber communicating with the chamber 12, the communication 14 between said chambers being controlled by a valve 15; a saw cylinder 16, operating in conjunction with the double hull boards 17 and 18, and a kicker roll 19. These parts are the same as set forth and claimed in the Parks's application above referred to and need no further description, as their operation is well known to those skilled in the art. The only difference is one of arrangement of the parts, owing to the fact that in the present machine, the cotton and bolls are fed into the machine from the rear, instead of from the top, as in the Parks's machine. Extending outward from, and leading into the breaking chamber 12, is a hopper 20, suitably supported on projecting frame members 21, into which hopper the bolls as they are snapped from the plants, are thrown. In the bottom of this hopper, adjacent to the breaking cylinder, is a feed roller 22. The object of this feed roller is to cause the cotton and hulls to be fed gradually into the breaking chamber, and thus prevent overloading in case a large quantity should be thrown into the hopper at any one time. Ordinarily, the cotton and hulls, or bolls, are fed through as fast as thrown into the hopper, and without any accumulation in the latter. The feed roller, therefore, is not an essential element of the invention, but is employed merely as a protection against over-loading. In place of the doffer brush ordinarily used in machines of the type referred to, I employ a combined brush and fan, indicated generally by the numeral 23. This fan revolves in a casing 24 from which extends upward to a considerable height a wind trunk 25, on the top of which is rotatably mounted a curved spout 26, which may be turned to one side or the other of the machine to deliver cotton to one or the other of two bags, or other receptacles, 27, 28, supported above the machine on opposite sides thereof. In this construction, brushes 29 are located on the outer ends of the fan blades 30, the brushes serving to remove the cotton from the saw cylinder 16, and the air blast created by the fan blades blowing it up through the wind trunk 25, whence it is discharged through the spout 26 into one or the other of the receptacles 27, 28.

As shown in Fig. 1, the machine is so arranged that, in operation, the hopper 20 will move between two rows of cotton plants indicated by the numerals 31. Two or more operators follow the machine, and as the plants are reached the bolls are snapped from the stalks, and thrown into the hopper 20. The bolls, cotton and hulls fall down this hopper and are fed by the feed roller into the breaking chamber, where the bolls are broken by the breaking cylinder 10, and the cotton and hulls are withdrawn therefrom through the opening 14 by the picker roll 13. The latter delivers the cotton and hulls to the saw cylinder, the hulls being separated from the cotton by the kicker roll 19; and either they are knocked by the saw cylinder between the hull boards 17 and 18, or they pass out of the machine through the space between the lower hull board 18 and the saw cylinder. The cotton carried through by the saw cylinder is removed by the brushes 29 and forced by the air blast created by the fan blades 30 up through the wind trunk 25 and delivered by the spout 26 into one or the other of the receptacles 27, 28.

I claim:—

1. A portable harvesting and cotton separating machine, comprising a boll breaker, a hopper for delivering gathered cotton and bolls to the boll breaker, mechanism coöperating with said boll breaker for separating the cotton from the mixed cotton and hulls delivered by said boll breaker, a receptacle on said machine, and having its upper end supported in an elevated position with respect thereto, and means for elevating the cotton delivered by said separating mechanism and discharging it into said receptacle.

2. A portable harvesting and cotton separating machine comprising a boll breaker, a hopper accessible to an operator on the ground for receiving gathered or snapped cotton and bolls and delivering same to the boll breaker, mechanism for separating the cotton from the mixed cotton and hulls delivered by the boll breaker, a receptacle on said machine, a wind trunk communicating at opposite ends with said receptacle and said cotton separating mechanism, respectively, and means for continuously recovering cotton from said separating mechanism and blowing it upward through said wind trunk into said receptacle.

3. A portable harvesting and cotton separating machine, comprising boll breaking and cotton separating mechanisms, a hopper carried by said machine, accessible to an operator on the ground, for receiving the gathered or snapped cotton and bolls and delivering same to the boll breaking mechanism, a receptacle carried by said machine, a conduit leading from the separating mechanism to said receptacle, and means for continuously recovering cotton from the separating mechanism and forcing it through said conduit to said receptacle.

4. A portable cotton harvesting and separating machine comprising cotton separating mechanism including a saw cylinder, a boll breaker, a hopper accessible to an operator on the ground for receiving gathered or snapped cotton and bolls and delivering the same to the boll breaker, means for delivering the cotton and hulls from the boll breaker to the cotton separating mechanism, a receptacle carried by said machine, a fan casing, a wind trunk leading from said fan casing to said receptacle, and a combined fan and doffer brush rotating inside of said fan casing adjacent to said saw cylinder and operating to remove the cotton from the saw cylinder and simultaneously, by the air blast created, to force the cotton through the wind trunk to said receptacle.

In testimony whereof, I have hereunto set my hand.

JOHN E. MITCHELL.